(12) United States Patent
Maguire et al.

(10) Patent No.: US 11,750,447 B2
(45) Date of Patent: Sep. 5, 2023

(54) CONFIGURING A NETWORK SLICE

(71) Applicant: Telefonaktiebolaget LM Ericsson (publ), Stockholm (SE)

(72) Inventors: Patrick Maguire, Athlone (IE); Jan Groenendijk, Athlone (IE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/734,617

(22) PCT Filed: Oct. 8, 2018

(86) PCT No.: PCT/EP2018/077359
§ 371 (c)(1),
(2) Date: Dec. 3, 2020

(87) PCT Pub. No.: WO2019/238253
PCT Pub. Date: Dec. 19, 2019

(65) Prior Publication Data
US 2021/0160131 A1 May 27, 2021

Related U.S. Application Data

(60) Provisional application No. 62/685,653, filed on Jun. 15, 2018.

(51) Int. Cl.
*G06F 15/173* (2006.01)
*H04L 41/0806* (2022.01)
(Continued)

(52) U.S. Cl.
CPC ...... *H04L 41/0806* (2013.01); *H04L 41/0826* (2013.01); *H04L 41/0886* (2013.01);
(Continued)

(58) Field of Classification Search
CPC ............ H04L 41/0806; H04L 41/0826; H04L 41/0886; H04L 41/0896; H04W 28/0263; H04W 48/18
(Continued)

(56) References Cited

U.S. PATENT DOCUMENTS 10,278,123 B2 4/2019 Wang et al.
10,986,540 B2 * 4/2021 Bor Yaliniz .......... H04W 28/26
(Continued)

FOREIGN PATENT DOCUMENTS

CN 107852608 A 3/2018
CN 108024255 A 5/2018
(Continued)

OTHER PUBLICATIONS

3rd Generation Partnership Project, "3rd Generation Partnership Project; Technical Specification Group Services and System Aspects; Management and Orchestration of Networks and Network Slicing; Provisioning Stage 1 (Release 15)", Technical Specification, 3GPP TS 28.531 V1.0.0, Jun. 1, 2018, pp. 1-31, 3GPP.
(Continued)

*Primary Examiner* — Atta Khan
(74) *Attorney, Agent, or Firm* — COATS & BENNETT, PLLC (57) ABSTRACT

In one example aspect, a method performed by a network node for configuring a network slice is provided, the method comprising, in response to a request to configure a network slice, configuring network resources for providing the network slice, and configuring a state of the network slice to a first state, wherein in the first state the network slice is disabled.

18 Claims, 8 Drawing Sheets

(51) Int. Cl.
*H04L 41/0826* (2022.01)
*H04L 41/08* (2022.01)
*H04L 41/0896* (2022.01)
*H04W 28/02* (2009.01)
*H04W 48/18* (2009.01)

(52) U.S. Cl.
CPC ..... *H04L 41/0896* (2013.01); *H04W 28/0263* (2013.01); *H04W 48/18* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 2017/0141973 | A1* | 5/2017 | Vrzic | H04W 76/11 |
| 2018/0124660 | A1 | 5/2018 | Zhang et al. | |
| 2018/0278466 | A1* | 9/2018 | McCormick | H04L 41/40 |
| 2018/0302877 | A1* | 10/2018 | Bosch | H04W 84/00 |
| 2019/0109768 | A1* | 4/2019 | Senarath | H04W 48/18 |
| 2019/0261184 | A1* | 8/2019 | Xu | H04W 16/02 |
| 2020/0120589 | A1* | 4/2020 | Velev | H04W 76/25 |

FOREIGN PATENT DOCUMENTS

| | | |
|---|---|---|
| WO | 2017044151 A1 | 3/2017 |
| WO | 2018082574 A1 | 5/2018 |

OTHER PUBLICATIONS

CCITT, "Data Communication Networks: Information Technology—Open Systems Interconnection—Systems Management: State Management Function", Recommendation X.731, Jan. 1, 1992, pp. 1-29, ITU.

3rd Generation Partnership Project, "3rd Generation Partnership Project; Technical Specification Group Services and System Aspects; Telecommunication Management; Management of 5G Networks and Network Slicing Concepts, Use Cases and Requirements (Release 15)", Technical Specification, 3GPP TS 28.530 V0.6.0, Apr. 1, 2018, pp. 1-29, 3GPP.

Next Generation Mobile Networks, "NGMN 5G White Paper", A Deliverable by the NGMN Alliance, Version 1.0, Feb. 17, 2015, pp. 1-125, NGMN.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.1.0, Mar. 1, 2018, pp. 1-201, 3GPP.

3rd Generation Partnership Project, "3rd Generation Partnership Project; Technical Specification Group Services and System Aspects; Telecommunication Management; Study on Management and Orchestration of Network Slicing for Next Generation Network (Release 15)", Technical Report, 3GPP TR 28.801 V15.1.0, Jan. 1, 2018, pp. 1-75, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.3.1, Mar. 1, 2017, pp. 1-97, 3GPP.

* cited by examiner

CONFIGURING A NETWORK SLICE

BACKGROUND

Wireless communications networks, such as for example cellular or mobile networks, may be built with technologies that use logical instead of physical resources, and which enable operators to provide network slices. However, for Network Slicing to be commercially viable, supporting orchestration and management capabilities may be provided that enable faster and more flexible service creation (TTM) and service fulfilment (TTC), while at the same time keeping operating expense under control.

To support this, network slices may be described by "blueprints" that are machine readable to assist automation. A blueprint may describe the type of resources/components that a network slice is composed of and how they are interconnected and configured to give the desired characteristics and features.

Before a network slice (carrying real customer traffic) can be instantiated (from some blueprint), the following preparations may be undertaken:

- The blueprint to be used needs to be available and onboarded for use.
- Shared resources, functions and/or sub-network instances to be used by this type of slice may be made available (e.g. instantiated/configured).
- Sufficient resources may be made available in the underlying systems (e.g. cloud/Network Functions Virtualization, NFV).
- All domains may expose an abstract representation of their infrastructure and topology to the Network Management System (NMS) to support decision making at instantiation time.

After this, a network slice can be instantiated. The "instantiation" may incorporate:

- Allocation of virtual resources.
- Connectivity of these resources.
- Configuration of these resources.
- Reconfiguration of existing shared resources.

In some examples, for example 5G networks, when a network slice is instantiated, a Single Network Slice Selection Assistance Information (S-NSSAI), which identifies the network slice, is added to the Network Slice Selection Function (NSSF) as an allowed S-NSSAI.

There currently exist certain challenge(s). In some examples, the network (NW) slice will be available to the network (i.e. it is listed as an "Allowed S-NSSAI" in the NSSF), even though there may be no services deployed to run on the NW slice (e.g. User Equipment, UE, or device subscription data in Unified Data Management, UDM, does not have this NW slice specified as a "Subscribed S-NSSAI"). Additionally or alternatively, allocated shared resources may be reserved but not used as no subscribers are provisioned and authorized to use these allocated resources. At high load, other services (e.g. other network slices) may not be able to access such reserved resources, which may result in underuse of resources, such as radio resources.

Deployment of a NW slice may involve a mix of automated and manual steps. Hence, deploying, removing and redeploying NW slices upon the provisioning and deprovisioning of services may not be practical.

SUMMARY

One aspect of the present disclosure provides a method performed by a network node for configuring a network slice. The method comprises, in response to a request to configure a network slice, configuring network resources for providing the network slice and configuring a state of the network slice to a first state, wherein in the first state the network slice is disabled.

A further aspect of the present disclosure provides a network node for configuring a network slice. The network node comprises a processing circuitry and a memory. The memory contains instructions executable by the processing circuitry such that the network node is operable to, in response to a request to configure a network slice, configure network resources for providing the network slice, and configure a state of the network slice to a first state, wherein in the first state the network slice is disabled.

An additional aspect of the present disclosure provides a network node for configuring a network slice. The network node is configured to configure network resources for providing the network slice, and configure a state of the network slice to a first state, wherein in the first state the network slice is disabled.

BRIEF DESCRIPTION OF THE DRAWINGS

For a better understanding of examples of the present disclosure, and to show more clearly how the examples may be carried into effect, reference will now be made, by way of example only, to the following drawings in which.

and

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Examples of the present disclosure provide a communication system whereby data is sent using multiple carriers from multiple antennas. However, a particular subcarrier is only sent from one antenna. Therefore, in some examples, signals transmitted from different antennas can be considered as orthogonal, where orthogonal subcarriers are used. In some cases, the communication system may be considered as multiple single-input single-output (SISO) or single-input multiple-output (SIMO) systems, which may reduce overhead and/or processing complexity compared to a MIMO system. Furthermore, in some examples, as not all subcarriers are transmitted from a single antenna, signals transmitted from a single antenna can be increased in power without increasing the overall power transmitted using all available subcarriers from a single antenna.

Figure 1:
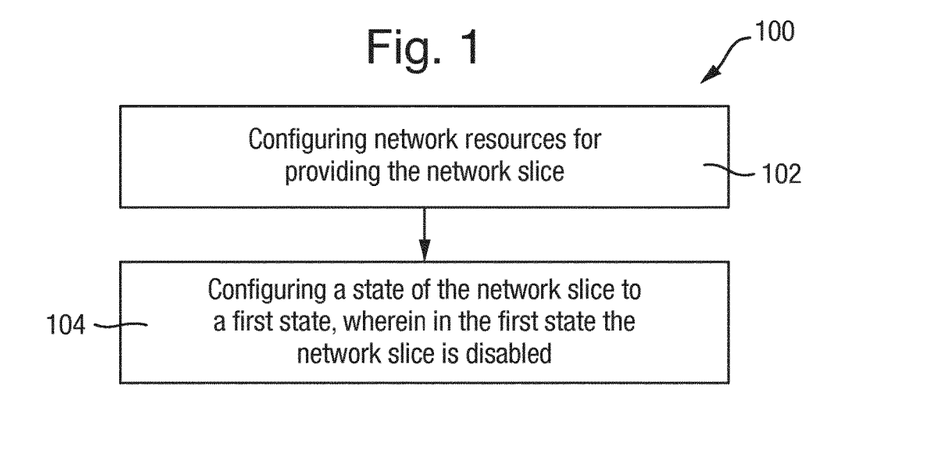
FIG. 1 is a flow chart of an example of a method performed in a network node for configuring a network slice.

FIG. 1 is a flow chart of an example of a method 100 performed by a network node for configuring a network slice. The method 100 or the steps thereof may be performed in response to a request to configure (e.g. create or allocate) a network slice. For example, the request to configure a network slice may comprise a service request which is part of the service orchestration life cycle management (LCM), e.g. a communications service provider, CSP, receives a request for a particular service which results in the deployment of a network slice.

The method 100 comprises, in step 102, configuring network resources for providing the network slice, and in step 104, configuring a state of the network slice to a first state, wherein in the first state the network slice is disabled.

Thus, in some embodiments, a network slice may be configured (e.g. an instance of the network slice may be instantiated, and/or resources associated with providing the network slice may be configured, allocated and/or connected) and yet in some examples the network resources for providing the network slice (e.g. to User Equipments, UEs) may not yet be reserved, usable, enabled or made available. The resources (such as radio resources and/or core network resources for example) may be made available, enabled or usable at a later time, such as for example when a first service on the network slice is to be provisioned or is provisioned. In some examples, the state of the network slice may be moved between enabled and disabled (and possibly also null) as and when the network slice is required for a service to be provisioned over it. For example, if a last remaining service on the network slice is deprovisioned, the network slice may be set to disabled. However, the network resources may remain configured, so that if the network slice is once again set to enabled, at least some of the network configuration may not be needed to enable the network slice and provision services using the network slice.

In some examples, configuring the state of the network slice to the first state comprises configuring a state of a CN to UEUsageType mapping associated with the network slice to the first state (e.g. disabled state). Configuring a state of a CN to UEUsageType mapping associated with the network slice to the first state may in some examples comprise configuring the state of the CN to UEUsageType mapping associated with the network slice in a Home Subscriber Server (HSS). Additionally or alternatively, in some examples, configuring the state the network slice to the first state comprises configuring a state of a Single Network Slice Selection Assistance Information (S-NSSAI) associated with the network slice to the first state (e.g. disabled state). This may comprise, for example, configuring the state of the S-NSSAI associated with the network slice in a Network Slice Selection Function (NSSF).

These are merely examples of configuring the state of the network slice to the first, disabled, state, and in other embodiments other procedures for configuring the network slice may be used.

In some examples, configuring network resources for providing the network slice comprises adding a CN to UEUsageType mapping associated with the network slice to a HSS, and/or adding a S-NSSAI associated with the network slice to a NSSF. Additionally or alternatively, in some examples, configuring network resources for providing the network slice comprises configuring radio nodes to implement the network slice. These are merely examples of configuring network resources for providing the network slice, and in other embodiments other procedures for configuring network resources may be used In some examples, the method 100 further comprises configuring the state of the network slice to a second state, such as for example an enabled state in which the network slice may be used (e.g. by a service and/or a UE). Thus, for example, in the second state the network slice is enabled, usable and/or available, and services may be provisioned on the network slice that make use of resources allocated or reserved for the network slice. In some examples, configuring the state of the network slice to the second state (e.g. enabled state) comprises configuring a state of a CN to UEUsageType mapping associated with the network slice to the second state. This may comprise for example configuring the state of the CN to UEUsageType mapping associated with the network slice in a HSS. Additionally or alternatively, in some examples, configuring the state the network slice to the second state comprises configuring a state of a S-NSSAI associated with the network slice to the second state. This may comprise configuring the state of the S-NSSAI associated with the network slice in a NSSF.

In some examples, the method 100 comprises configuring the state of the network slice to the second state (e.g. enabled state) in response to provisioning of a service on the network slice, such as for example the first service on the network slice (e.g. since its configuring or since it was last set to the disabled state). The first service may be a service provisioned on a network slice that has no currently available or running services, or the only service running or available on the network slice once it has been provisioned. Thus, for example, the network slice may be configured to the second, enabled, state when it is needed by a service being provisioned to use it.

In some examples, the method 100 comprises, in response to configuring the state of the network slice to the second (e.g. enabled) state, reserving resources associated with the network slice. Thus for example the network slice may be 'ready' to be used, e.g. by a service and/or one or more UEs.

In some examples, configuring the state of the network slice to the second state comprises sending an instruction to a Device Manager to configure the state of the network slice to the second state. Thus, for example, the network node implementing the method 100 may act as a remote manager for the network slice that can instruct or control the Device Manager to perform the appropriate configuration of the network slice to the first state. In some examples, additionally or alternatively, the network node may also instruct or control the Device Manager to perform configuration of the state of the network slice to the first state (e.g. by sending an instruction to a Device Manager), and/or to configure network resources for providing the network slice comprises (e.g. by sending an instruction to a Device Manager (DM) to configure resources for providing the network slice).

In some examples, the method comprises, after configuring the state of the network slice to the second state, configuring the state of the network slice to the first state (e.g. disabled state) in response to deprovisioning of a service on the network slice, such as for example the last or only service currently running or available on the network slice. Therefore, for example, if there are no longer any services using or provisioned on the NW slice, the NW slice may be returned to the disabled state, and any associated resources (e.g. radio and/or core network resources) may be made available, e.g. to other network slices or functions. In some examples, at least some configuration of network resources may remain in place. Thus, in some examples, the method comprises, after configuring the state of the network slice to the second state, configuring the state of the network slice to the first state in response to a determination that no services are provisioned on the network slice. In some examples, configuring the state of the network slice to the first state after configuring the state of the network slice to the second state comprises sending an instruction to a Device Manager to configure the state of the network slice to the first state. In some examples, the method comprises releasing resources associated with the network slice in response to deprovisioning of a service on the network slice or in response to a determination that no services are provisioned on the network slice.

In some examples, configuring network resources for providing the network slice comprises allocating but not reserving resources associated with the network slice, and/or creating a slice instance associated with the network slice. Thus, in some examples, the allocated resources may be reserved for use by the network slice (or services using the network slice) when the network slice is set to an enabled state.

In some examples, the method comprises receiving the request to configure the network slice, such as for example from a Communications Service Management Function (CSMF).

In some examples, the network slice is associated with an additional state. The additional state of the network slice may be at least a locked state or an unlocked state. In the locked state, the network slice does not accept new wireless devices. That is, any wireless devices attempting to join the network slice will not be able to do so. In these examples, a "new" wireless device may comprise a device that is not joined to or connected to the network slice, although such a device may have been joined or connected to the network slice previously. In some examples, a network slice in the locked state may still allow existing wireless devices to remain joined or connected to the network slice and/or receive services over the network slice.

In some examples, the additional state of the network slice may additionally include a shutting down state. In the shutting down state, the network slice does not accept new wireless devices; and the method comprises configuring the additional state of the network slice from the shutting down state to the locked state when a last wireless device leaves the network slice.

In some examples, the state of the network slice is configured to the enabled state in response to a request to create or allocate a Network Slice Subnet Instance (NSSI) associated with the network slice. For example, following creation or allocation of the network slice (e.g. the Network Slice Instance, NSI, associated with the network slice), there may be no NSSIs associated with the network slice, and hence the network slice is disabled. Then, following creation or allocation of an associated NSSI, the state of the network slice may be set to enabled. Conversely, for example, the state of the network slice may be configured to the disabled state in response to a request to delete or deallocate a Network Slice Subnet Instance (NSSI) associated with the network slice, such as for example the last NSSI associated with the network slice.

Figure 2:
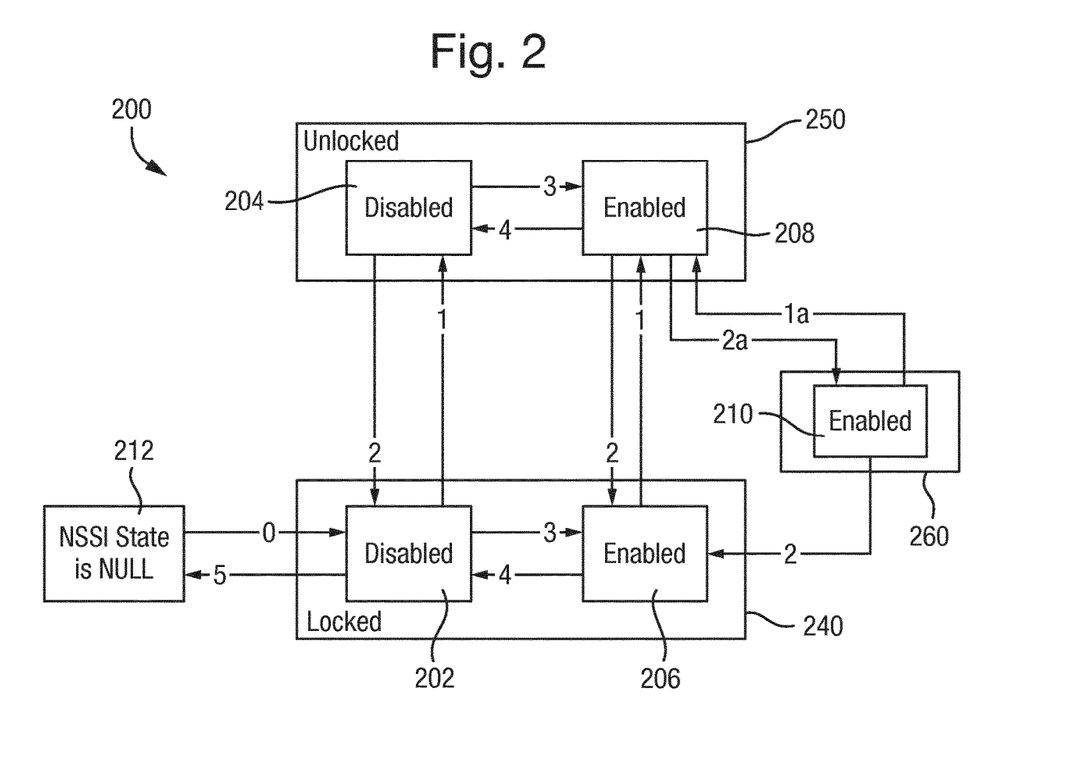
FIG. 2 shows an example state diagram for a network slice.

FIG. 2 shows an example of a state diagram 200 illustrating the state and additional state of an example network slice (e.g. NSI or NSSI). In states 202 and 204, the state of the network slice is disabled, and in states 206, 208 and 210, the state of the network slice is enabled. Additionally, in states 202 and 206, the additional state of the network slice is locked, 240, and in states 204 and 208, the additional state is unlocked (e.g. the network slice may accept new wireless devices), 250. In state 210, the additional state is the shutting down state, 260. In state 212, e.g. before creation or allocation of the network slice, and following deletion and/or deallocation of the network slice, the state (and also in some examples the additional state) is NULL.

The table below illustrates examples of state transitions, which are numbered 0 to 5 in FIG. 2, and the events that cause the state transitions.

| Trigger number | The state transition events and actions |
| --- | --- |
| 0 | A network slice management function (NSMF) responds positively to an "Allocate NSI request" message, the NSI is created and the state is set to Locked |
| 1 | NSMF responds positively to an "Activate NSI request" message (identifying the NSI to be activated), or CM operation to set administrative state to Unlocked . . . |
| 1a | CM Operation to set administrative state to Unlocked |
| 2 | CM Operation to set administrative state to Locked |
| 2a | The last user of the NSI stops using the NSI |
| 3 | When the NSI and its constituents are installed and working, or NSMF receives positive response to an "Allocate NSSI" message (applicable to the NSI to be enabled). |

-continued

| Trigger number | The state transition events and actions |
|---|---|
| 4 | When the NSI or its constituents are not installed or not working, or NSMF receive positive response to a "Deallocate NSSI" message (applicable to the NSI to be disabled) |
| 5 | NSMF responds positively to a "Deallocate NSI request" message, the NSI is deleted and the state is set to NULL. |

Certain embodiments may provide one or more of the following technical advantage(s). A Service Life Cycle Management (LCM) and NW Slice LCM can be decoupled, and this may give greater flexibility to operator processes, and/or enable operators/service providers to address new business models which are envisaged will be a reality in 5G (e.g. provisioned services will come and go in a more flexible way). Additionally or alternatively, finite shared network resources may be used in a more optimal way at high load situations.

In some examples, advantages include that network operators may have a clearer view of their network from a management perspective. For example, provisioned resources in network are only enabled for traffic when the first service is provisioned on the associated NW slice and are subsequently disabled when the last service is deprovisioned from the associated NW slice. Without this, it may be difficult or impossible to determine from the network performance data on traffic, and/or any problems with such shared resources, without additional investigation.

An operator may be able to offer time-based services (logical networks) allowing a customer to use its own logical network according to a contracted schedule.

In some examples, advantages include that an operator may be able to leave an unused network slice instance idle (e.g. disabled) with the expectation that it can serve a new user/business purpose (e.g. provide a further network slice) within a short period of time. This may be more efficient than decommission a network slice instance and commission a new network slice instance within a short period of time.

In some examples, advantages include that the resources allocated to the network slice that is idle (e.g. disabled) may in some examples not be re-allocated for another purpose that operator may not be able to control. This solution may avoid the situation where the operator has released and de-allocated resources, which the operator may need again after a short period of time, and which may have been re-allocated for another purpose, e.g. for a different network slice, in the mean time.

Specific example embodiments will now be described.

Some embodiments of this disclosure assume at least one of the following:
1. A NW slice blueprint (service templates) is onboarded.
2. A NW slice may or may not already be deployed to support a particular customer service request.
3. Domain resources are available for allocation and configuration.

Some embodiments of this disclosure propose at least one of the following:
a. New state handling for all resources associated with a NW slice. For example, handling of S-NSSAI in terms of 5G; and/or handling of UeUsageType in terms of 4G, although in some examples only applicable to CORE network (e.g. Décor & eDecor).
b. Make the management of a NW Slice fully automated and independent of the presence of services.

Figure 3:
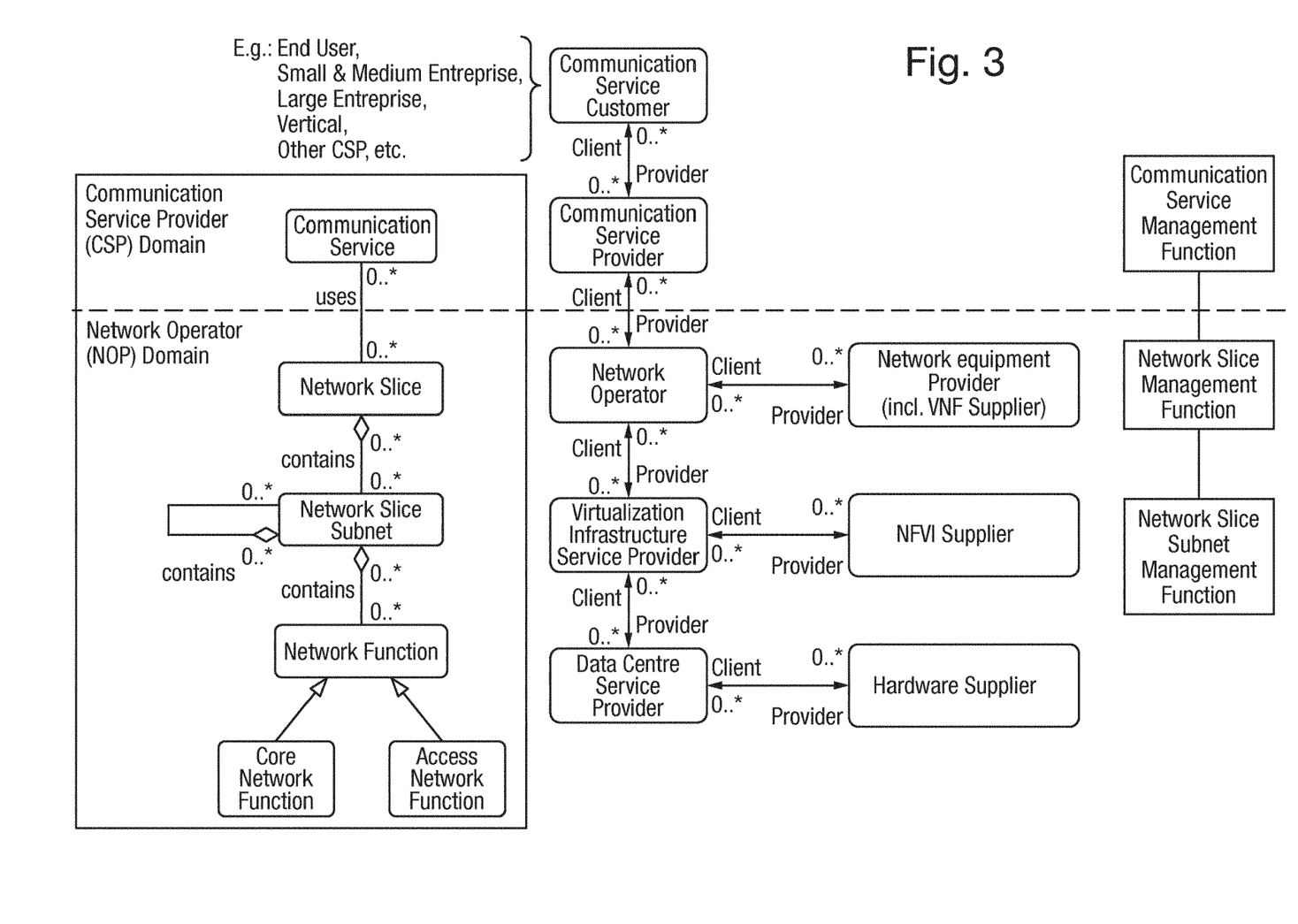
FIG. 3 shows an example of the relationship between roles and the associated management functions in a network.

FIG. 3 shows an example of the relationship between roles (i.e. Communications Service Provider, CSP and Network Operator, NOP) and the associated management functions (i.e. Communications Service Management Function, CSMF and Network Slice Management Function, NSMF).

Figure 4:
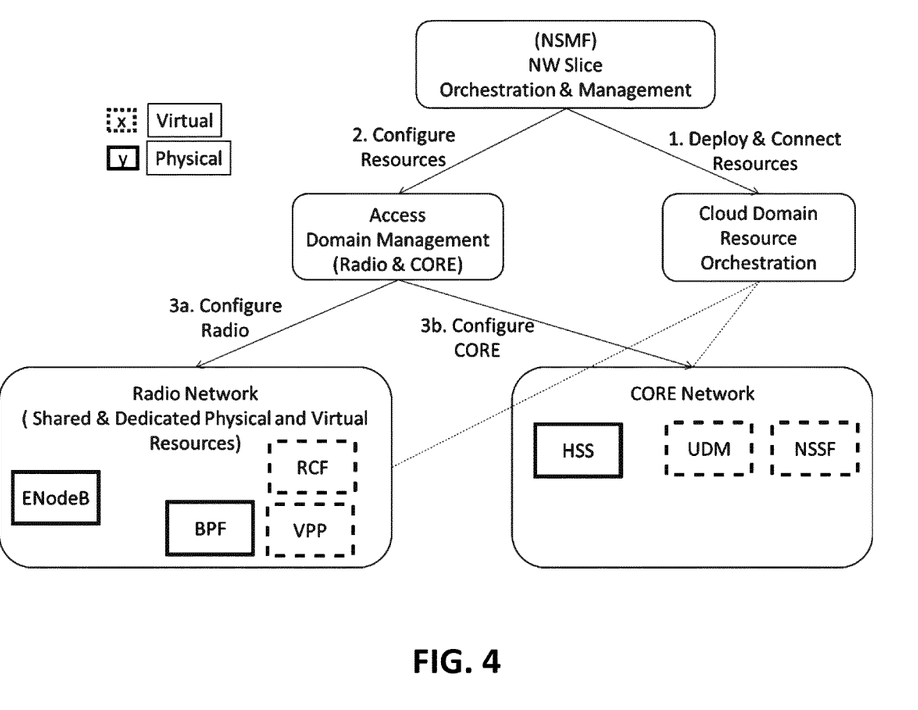
FIG. 4 shows an example of functions and steps involved in deploying a network slice.

FIG. 4 shows an example of the functions and steps involved in deploying a NW slice, summarized below:
1. Deploy and connect required resources as outlined in service template (e.g. indicated in a service request, such as for example one received by a network node) and specified by NSMF.
2. Configure resources, both those just deployed and any specified shared (already deployed resources).

In some examples, depending on the deployment, shared resources (virtual and/or physical) may be reconfigured and some dedicated virtual resources may also be configured for a network slice. Configuration will in some examples include but not be limited to S-NSSAI configuration including proposed state behaviour for at least some resources for the network slice.

In some examples, in Evolved Packet Core (EPC) deployment, the Home Subscriber Server (HSS) UeUsageType may be configured, including proposed state behaviour. In some examples, in 5G Core (5GC) deployment, the Network Slice Selection Function (NSSF) is configured with S-NSSAI including proposed state behaviour and S-NSSAI related subscriber data is configured in Unified Data Management (UDM).

In some examples, the NW slice is a logical entity that only exists in the management system (NSMF). After the instantiation and configuration the NW slice instance exists and is visible and manageable from the management system.

Figure 5:
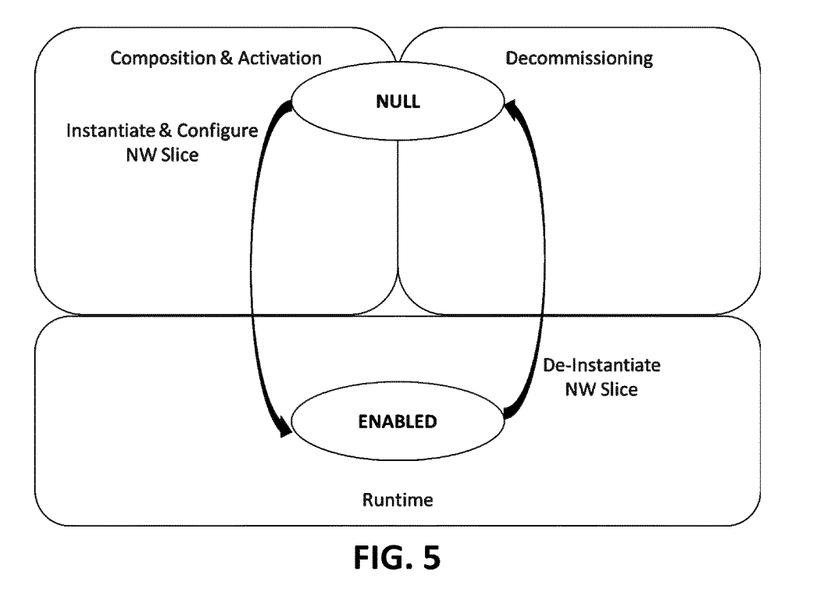
FIG. 5 shows an example state behavior of a network slice.

In an example state behavior of a network slice shown in FIG. 5, once the network slice is instantiated and configured, the network slice instance is enabled, and services are allowed to use it. The state change from NULL to Enabled signifies the change from being a non-existent entity to an entity that can carry services (Runtime). For example, resources are allocated and/or reserved for use by the network slice or services using the network slice. The opposite happens during the state change from Enabled to NULL, where the network slice instance is decommissioned or de-instantiated. At this point, the resources associated with the network slice may be de-allocated.

In the NULL state the network slice does not exist, the dedicated resources are not instantiated, and the shared resources are not configured. In the Enabled state the network slice instance (e.g. logical network) exists, and all required resources are instantiated and configured. Once the network slice is not required anymore (e.g. there is no supporting business, there are no wireless devices attached, connected or joined to the slice, and/or there are no services running using the slice) the operator may decide to de-instantiate the network slice instance, the resources are reconfigured, and the instantiated resources are released. In the transition from Enabled to NULL the network slice instance ceases to exist.

Figure 6:
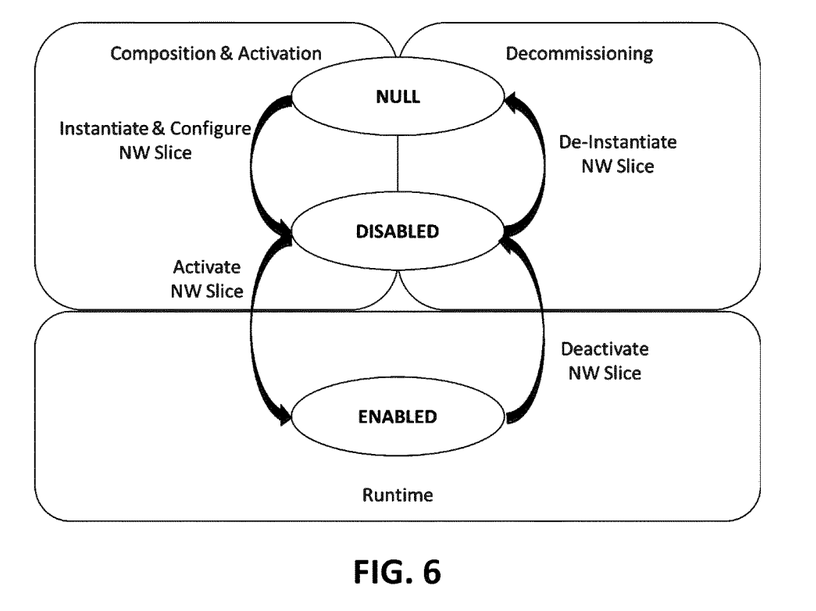
FIG. 6 shows an example state behavior of a network slice according to some embodiments.

FIG. 6 shows an example state behavior of a network slice according to some embodiments. In FIG. 6 a new network slice instance is created and set to the disabled state, i.e the network slice entity exists but cannot be used to carry services as it is in the disabled state. In some examples, resources may be allocated and/or configured for the network slice, but resources may not yet be reserved. It is now possible to control the moment the network slice instance can carry a service. Once the first service is provisioned, a trigger will activate the network slice instance and bring it to the enabled state. In some examples, resources associated with or allocated to the network slice may be reserved at this point. Once the last service using the network slice instance is de-provisioned, the network slice instance moves to the disabled state. In the disabled state the network slice instance still exists, e.g. resources associated with the network slice or allocated to the network slice are still instantiated and configured according the "blueprint" or service template. If a new service is provisioned for the network slice instance, the state changes from disabled to enabled again.

Figure 7:
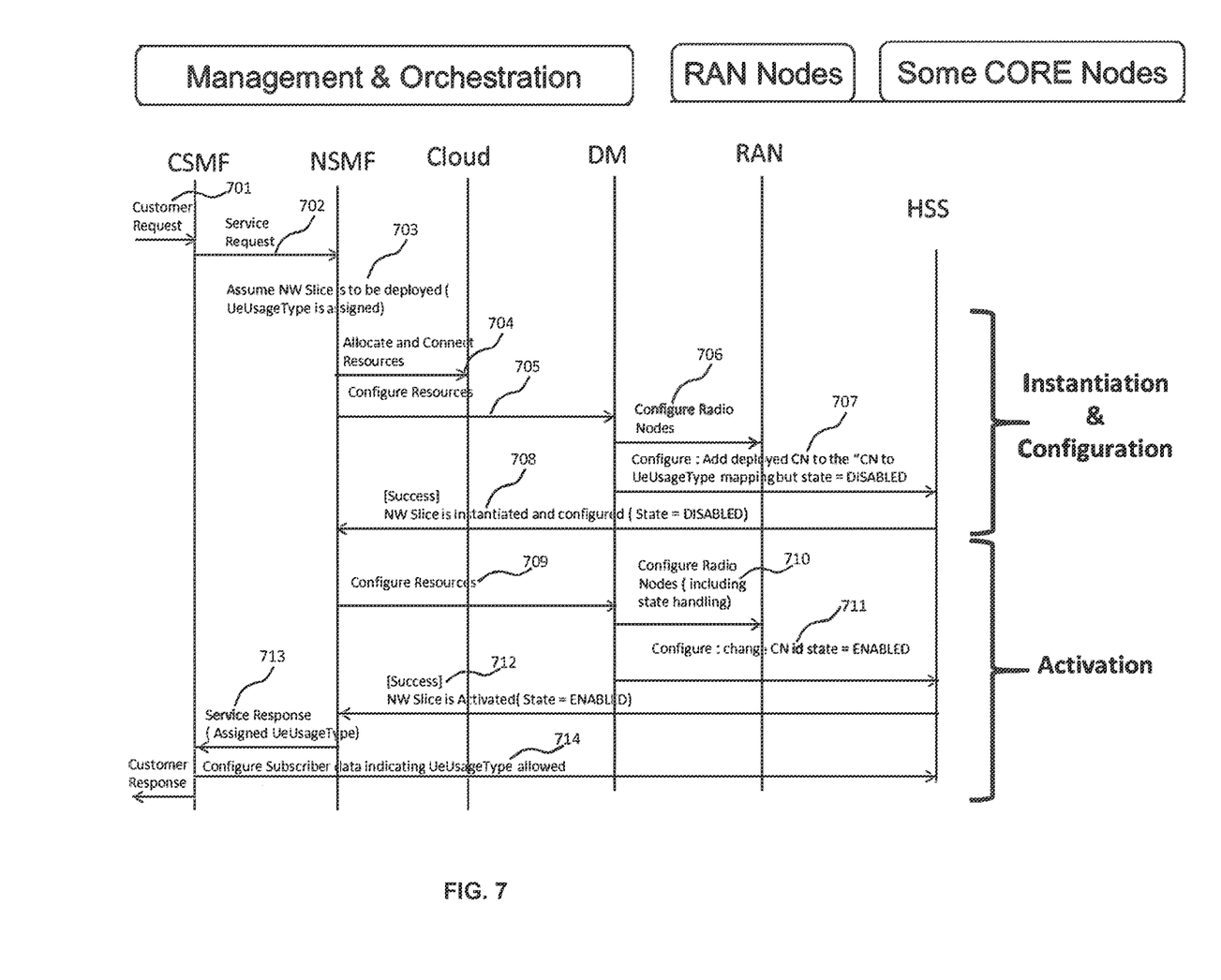
FIG. 7 shows an example of a communication flow within a 4G network according to an embodiment.

FIG. 7 shows an example of a communication flow within a 4G network according to an embodiment. The example in FIG. 7 includes the following steps:

1) The customer requests, 701, the operator to support or provide a communication service via the CSMF. The CSMF analyses the request and sends a service request, 702, to the NSMF. The service request in this example is within the boundaries of a pre-defined set of parameters with pre-defined values.

2) Based on the service request and its inventory the NSMF decides if a network slice instance is available that can serve the request or if a new network slice instance needs to be created, 703.

3) A suitable network slice instance is not available in this example. In this case the NSMF allocates, 704, connects, and configures, 705, resources in the network to create a network slice instance. The network slice instance then exists, and its resources are managed through the Device Manager (DM), 706. The following steps may be performed to create a network slice instance:
   a. Configure the network slice instance state and set to Disabled
      i. In case the RAN is LTE and CN is EPC the HSS is configured with the CN id to UeUsageType mapping appropriate for the network slice and the state of the network slice is set to Disabled, 707.
      ii. The NSMF is informed of the successful outcome of the configuration of the state handling and the state of the network slice instance is Disabled, 708.

4) The NSMF has the network slice information in its inventory including the state which is Disabled. The NSMF requests, 709, 710, the Device Manager (DM) that manages the Core Network (CN) node, i.e. the Home Subscriber Server (HSS), to set the network slice instance with CN id to Enabled (e.g. UeUsageType to CN mapping is set to Enabled), 711, 712.

5) The NSMF service responds, 713, to the CSMF including the assigned UeUsageType.

6) The CSMF configures, 714, Subscriber data indicating UeUsageType=Allowed in the HSS.

Figure 8:
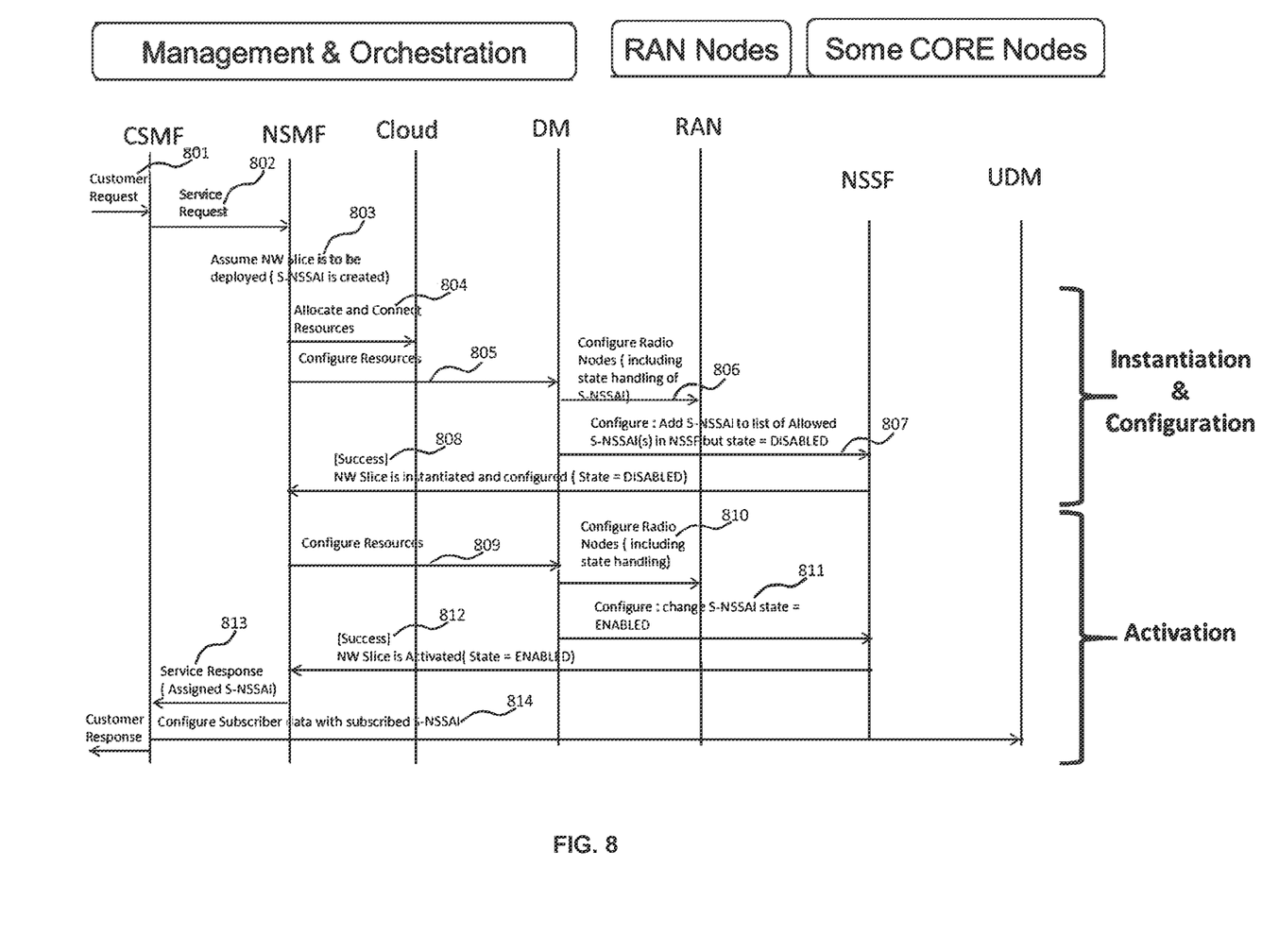
FIG. 8 shows an example of a communication flow within a 5G network according to an embodiment.

FIG. 8 shows an example of a communication flow within a 5G network according to an embodiment. The example in FIG. 8 includes the following steps:

1) The customer requests, 801, the operator to support or provide a communication service via the CSMF. The CSMF analyses the request and sends a service request, 802, to the NSMF. The service request in this example is within the boundaries of a pre-defined set of parameters with pre-defined values.

2) Based on the service request and its inventory the NSMF decides if a network slice instance is available that can serve the request or if a new network slice instance needs to be created, 803.

3) A suitable network slice instance is not available. In this case the NSMF allocates, 804, connects, and configures, 805, resources to create a network slice instance. The network slice instance then exists, and its resources are managed through the DM, 806. The following steps may be performed to create a network slice instance:
   a. Configure the network slice instance and set its state to Disabled.
      i. In case the Radio Access Network (RAN) is New Radio (NR), the RAN is configured with the state handling of the S-NSSAI, the Core Network (CN) is 5GC, the NSSF is configured with the allowed S-NSSAI and the state is set to Disabled, 807.
      ii. The NSMF is informed, 808, of the successful outcome of the configuration of the state handling and the state is of the network slice instance is Disabled.

4) The NSMF has the network slice information in its inventory including the state which is Disabled. The NSMF requests, 809, 810, the DM that manages the CN node NSSF to set the allowed S-NSSAI from Disabled to Enabled, 811, 812.

5) The NSMF service responds, 813, to the CSMF indicating result for S-NSSAI.

6) The CSMF configures, 814, Subscriber data for subscribed S-NSSAI in the HSS Additional example embodiments will now be described. TS 28.625 provides definitions on operational state, usage state and administrative state, according to the table below.

| | | |
|---|---|---|
| operationalState | This indicates the operational state of the object instance. It describes whether or not the resource is physically installed and working. This attribute is READ-ONLY. The meaning of these values is as defined in ITU-T Recommendation X.731. allowedValues: "Enabled", "Disabled". | type: String multiplicity: 1 isOrdered: N/A isUnique: N/A defaultValue: None isNullable: False |
| usageState | This indicates the usage state of the object instance. "It describes whether or not the resource is actively in use at a specific instant, and if so, whether or not it has spare capacity for additional users at that instant." This attribute is READ-ONLY. The meaning of these values is as | type: String multiplicity: 1 isOrdered: N/A isUnique: N/A defaultValue: None isNullable: False |

-continued

| | defined in ITU-T Recommendation X.731. allowedValues: "Idle", "Active", "Busy". | |
|---|---|---|
| administrativeState | This indicates the administrative state of the object instance. It describes the permission to use or prohibition against using the resource, imposed through the management services. The meaning of these values is as defined in ITU-T Recommendation X.731. allowedValues: "Locked", "Shutting down", "Unlocked". | type: String multiplicity: 1 isOrdered: N/A isUnique: N/A defaultValue: None isNullable: False |

Figure 9:
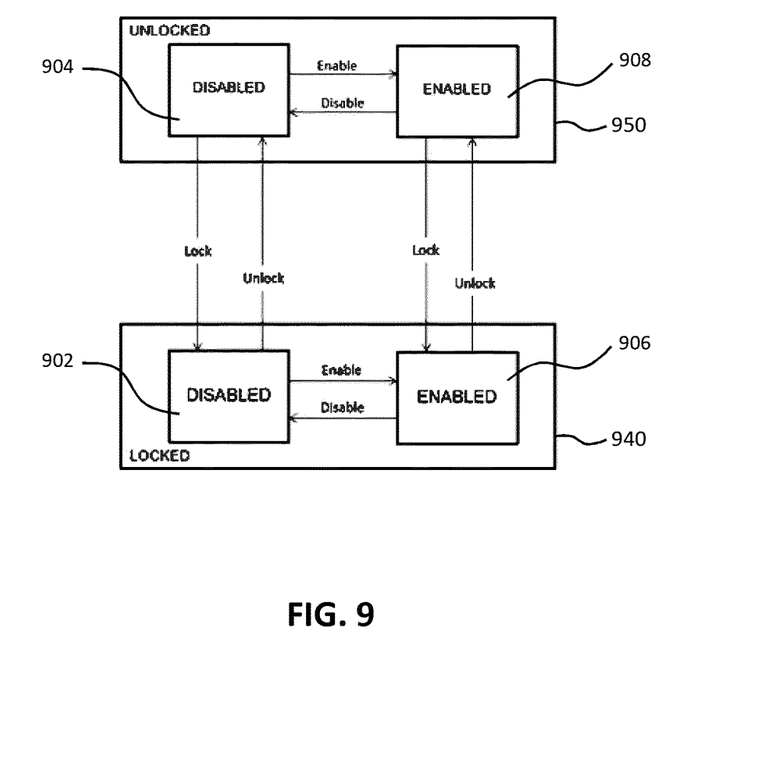
FIG. 9 shows an example state diagram for a network slice.

A network slice instance (NSI) is a logical object in the management system that represents a complex grouping of resources that may be in various states. At any time, the system needs to know the state of an NSI. The user(s) of a network slice instance are communication services, which are managed through the CSMF. A network slice instance is unaware of the communication services using the network slice instance. The network slice instance does not have a usage state. As the NSI is not aware of the users of the NSI it will not have a shutting down state. The administrative state can either be Locked or Unlocked. ITU-T X.731 has defined the inter-relation between the administrative state, operational state and usage state of systems in general. We suggest using the same, for the Combined state diagram for an NSI. One example of such combined NSI state diagram is illustrated in FIG. 9. In states 902 and 904, the state of the network slice is disabled, and in states 906 and 908, the state of the network slice is enabled. Additionally, in states 902 and 906, the additional state of the network slice is locked, 940, and in states 904 and 908, the additional state of the network slice is unlocked (e.g. the network slice may accept new wireless devices), 950.

In an NSI deployment scenarios, the interactions between CSMF, NSMF and NSSMF are standardized. The interactions specified under the column "The state transition events and actions" of "NSI state transition table" below must be present for the state transition. The state diagram supports the state changes when the NSI is in existence, the initial state after the NSI is created and configured is locked and disabled. The final state before the NSI is terminated is locked and disabled. The table below shows an NSI state transition table. AS is the administrative state and OS is the operational state.

| Trigger number | Trigger name | Target state | The state transition events and actions |
|---|---|---|---|
| 0 | — | AS = Locked; OS = Disabled; | NSMF receives "Create NSI request" message |
| 1 | Unlock | AS = Unlock. | NSMF receives the "Activate NSI request" message (identifying the NSI to be activated). |
| 2 | Lock | AS = Locked. | NSMF receives the "De-activate NSI request" message (identifying the NSI to be de-activated). |
| 3 | Enable | OS = Enabled. | When the required NSI resources are physically installed and working. NSMF receives the "Create NSSI response" message(s) (applicable to the NSI to be enabled). |
| 4 | Disable | OS = Disabled. | When the required NSI resources are not physically installed or not working. NSMF did not receive all "Create NSSI response" message(s) (applicable to the NSI to be enabled) after a "De-activate NSI request". |
| 6 | Delete | NULL | When an NSI is deleted. |

Although the subject matter described herein may be implemented in any appropriate type of system using any suitable components, embodiments disclosed herein are described in relation to a wireless network. A wireless network may include any elements suitable to support communication between wireless devices or between a wireless device and another communication device, such as a landline telephone, a service provider, or any other network node or end device. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 10:
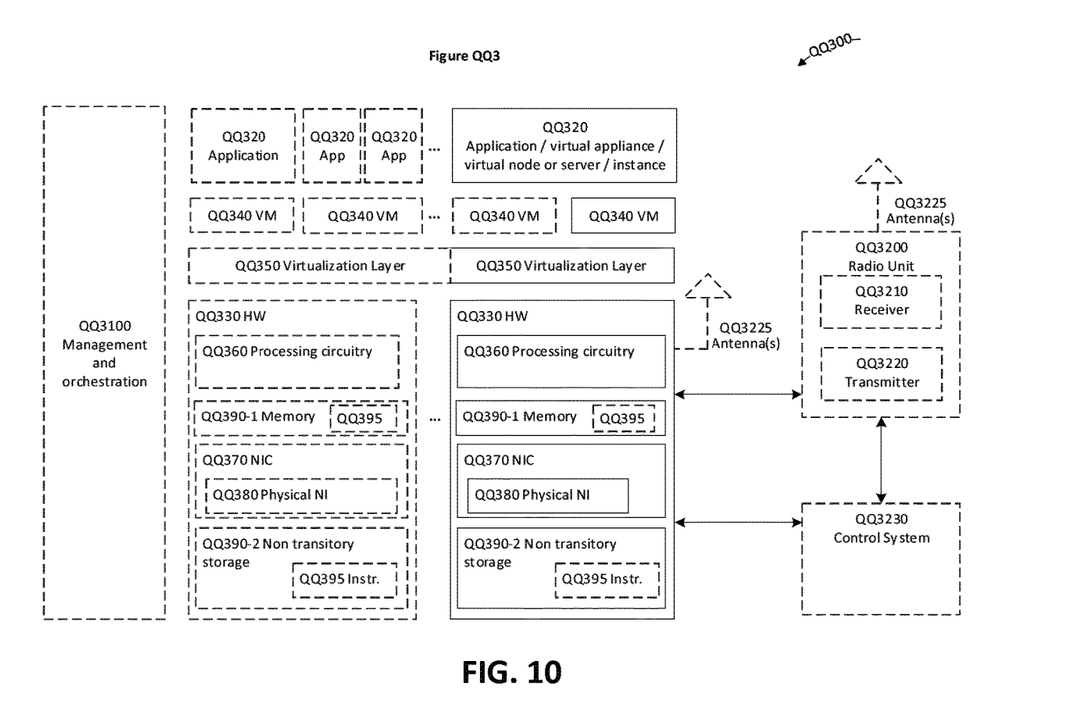
FIG. 10 is a schematic block diagram illustrating a virtualization environment.

FIG. 10 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340. As shown in FIG. 8, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment. In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 10.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 11:
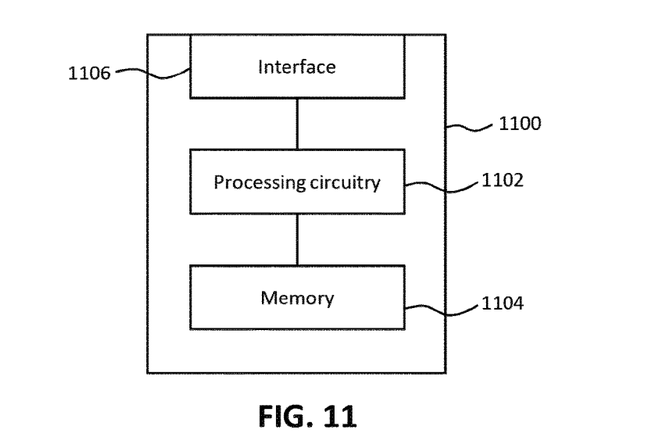
FIG. 11 is a schematic illustration of an example of a network node for configuring a network slice.

FIG. 11 is a schematic illustration of an example of a network node 1100 for configuring a network slice. The apparatus 1100 may in some examples be configured to perform the method of FIG. 1.

The apparatus 1100 comprises processing circuitry 1102 (e.g. one or more processors) and a memory 1104 in communication with the processing circuitry 1102. The memory 1104 contains instructions executable by the processor 1102. The apparatus 1100 also comprises an interface 1106 in communication with the processing circuitry 1102. Although the interface 1106, processing circuitry 1102 and memory 1104 are shown connected in series, these may alternatively be interconnected in any other way, for example via a bus.

In one embodiment, the memory 1104 containing instructions executable by the processing circuitry 1102 such that the apparatus 1100 is operable to is operable to, in response to a request to configure a network slice, configure network resources for providing the network slice, and configure a state of the network slice to a first state, wherein in the first state the network slice is disabled.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method, performed by a network node, for configuring a network slice, the method comprising, in response to a request to configure a network slice:
configuring network resources and creating a network slice having an enablement state with values of disabled and enabled, and an administrative state with values of locked and unlocked;
wherein when the enablement state is set to disabled, resources associated with the network slice are allocated but not reserved and the network slice is unusable and/or unavailable and does not carry services and when the enablement state is set to enabled, network resources associated with the network slice are reserved and the network slice can carry one or more services; and
wherein when the administrative state is set to locked, the network slice does not accept new wireless devices and when the administrative state is set to unlocked, the network slice may accept new wireless devices;
configuring the enablement state of the network slice to disabled; and
in response to provisioning a service on the network slice, configuring the enablement state of the network slice to enabled.

2. The method of claim 1, wherein configuring the enablement state of the network slice to disabled comprises configuring a state of a core network (CN) to UEUsageType mapping associated with the network slice to disabled.

3. The method of claim 1, wherein configuring the enablement state of the network slice to disabled comprises configuring a state of a Single Network Slice Selection Assistance Information (S-NSSAI) associated with the network slice to disabled.

4. The method of claim 1, wherein configuring network resources for providing the network slice comprises adding a Single Network Slice Selection Assistance Information (S-NSSAI) associated with the network slice to a Network Slice Selection Function (NSSF).

5. The method of claim 1, wherein configuring network resources for providing the network slice comprises configuring radio nodes to implement the network slice.

6. The method of claim 1, wherein configuring the enablement state of the network slice to enabled comprises configuring an enablement state of a Single Network Slice Selection Assistance Information (S-NSSAI) associated with the network slice to enabled.

7. The method of claim 1:
wherein an additional state of the network slice comprises a shutting down state in which the network slice does not accept new wireless devices; and
further comprising configuring the additional state of the network slice from the shutting down state to the locked value of the administrative state when a last wireless device leaves the network slice.

8. A network node adapted to configure a network slice, the network node comprising:
processing circuitry;
memory containing instructions executable by the processing circuitry whereby the network node is operative to, in response to a request to configure a network slice:
configure network resources and create a network slice having an enablement state with values of disabled and enabled, and an administrative state with values of locked and unlocked;
wherein when the enablement state is set to disabled, resources associated with the network slice are allocated but not reserved and the network slice is unusable and/or unavailable and does not carry services and when the enablement state is set to enabled, network resources associated with the network slice are reserved and the network slice can carry one or more services; and
wherein when the administrative state is set to locked, the network slice does not accept new wireless devices and when the administrative state is set to unlocked, the network slice may accept new wireless devices;
configure the enablement state of the network slice to disabled; and
in response to provisioning a service on the network slice, configure the enablement state of the network slice to enabled.

9. The network node of claim 8:
wherein an additional state of the network slice comprises a shutting down state in which the network slice does not accept new wireless devices; and
wherein the instructions are such that the network node is operable to configure the additional state of the network slice from the shutting down state to the locked value of the administrative state when a last wireless device leaves the network slice.

10. The network node of claim 8, wherein the instructions are such that the network node is operable to configure the enablement state the network slice to disabled by configuring a state of a Single Network Slice Selection Assistance Information (S-NSSAI) associated with the network slice to disabled.

11. The network node of claim 8, wherein the instructions are such that the network node is operable to configure network resources for providing the network slice the network node by adding a Single Network Slice Selection Assistance Information (S-NSSAI) associated with the network slice to a Network Slice Selection Function (NSSF).

12. The network node of claim 8, wherein the instructions are such that the network node is operable to configure network resources for providing the network slice the network node by configuring radio nodes to implement the network slice.

13. A communication system, comprising:
a host computer comprising:
first processing circuitry configured to provide user data; and
a communication interface configured to forward the user data to a cellular network for transmission to a user equipment (UE);
a cellular network comprising a network node having a radio interface and second processing circuitry, the network node's second processing circuitry configured to, in response to a request to configure a network slice:
configure network resources and create a network slice having an enablement state with values of disabled and enabled, and an administrative state with values of locked and unlocked;
wherein when the enablement state is set to disabled, resources associated with the network slice are allocated but not reserved and the network slice is unusable and/or unavailable and does not carry services and when the enablement state is set to enabled, network resources associated with the network slice are reserved and the network slice can carry one or more services; and
wherein when the administrative state is set to locked, the network slice does not accept new wireless devices and when the administrative state is set to unlocked, the network slice may accept new wireless devices;
configure the enablement state of the network slice to disabled; and
in response to provisioning a service on the network slice, configure the enablement state of the network slice to enabled.

14. The communication system of claim 13:
wherein the first processing circuitry of the host computer is configured to execute a host application, thereby providing the user data; and
wherein the UE comprises processing circuitry configured to execute a client application associated with the host application.

15. The method of claim 1, further comprising:
in response to one or more services being provisioned on the network slice, configuring the enablement state to enabled; and
in response to no services being provisioned on the network slice, configuring a state of the network slice disabled.

16. The network node of claim 8, wherein the instructions are such that the network node is operable to:
in response to one or more services being provisioned on the network slice, configuring the enablement state to enabled; and
in response to no services being provisioned on the network slice, configuring the enablement state of the network slice to disabled.

17. The communication system of claim 13, wherein the network node's second processing circuitry is further configured to:
in response to one or more services being provisioned on the network slice, configuring the enablement state to enabled; and in response to no services being provisioned on the network slice, configuring the enablement state of the network slice to disabled.

18. The method of claim 8, wherein the instructions are such that the network node is operable to configure the enablement state of the network slice to disabled by configuring a state of a core network (CN) to UEUsageType mapping associated with the network slice to disabled.

\* \* \* \* \*